(No Model.) 8 Sheets—Sheet 1.

W. L. CLOUSE & W. R. ANDERSON.
MACHINE FOR CUTTING AND BENDING NUT BLANKS.

No. 477,511. Patented June 21, 1892.

(No Model.) 8 Sheets—Sheet 6.
W. L. CLOUSE & W. R. ANDERSON.
MACHINE FOR CUTTING AND BENDING NUT BLANKS.
No. 477,511. Patented June 21, 1892.

(No Model.) 8 Sheets—Sheet 7.
W. L. CLOUSE & W. R. ANDERSON.
MACHINE FOR CUTTING AND BENDING NUT BLANKS.
No. 477,511. Patented June 21, 1892.
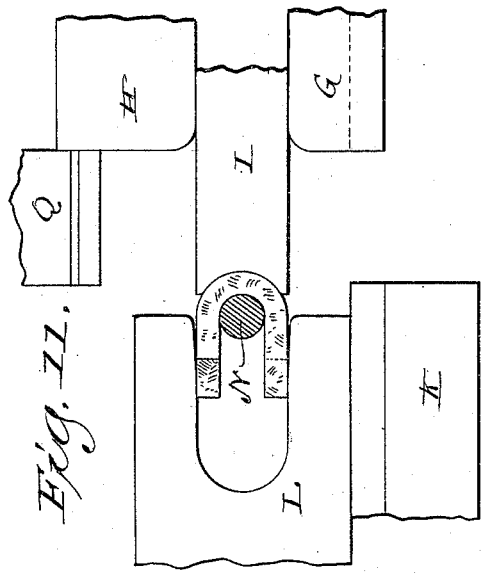
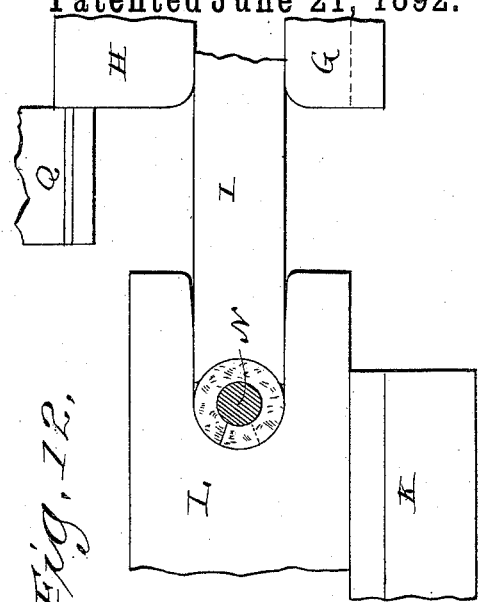
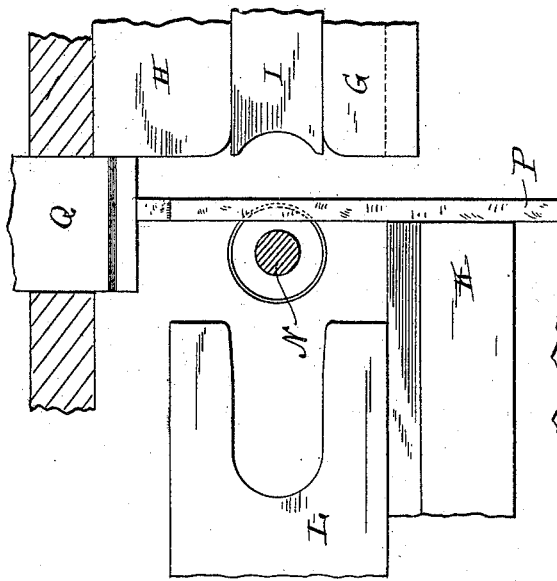
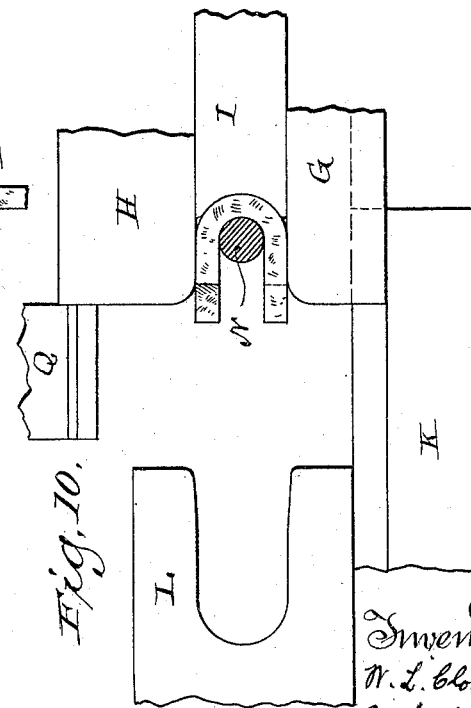
Witnesses
Geo. W. Young.
N. E. Oliphant
Inventors
W. L. Clouse.
W. R. Anderson.
By H. G. Underwood (No Model.) 8 Sheets—Sheet 8.

W. L. CLOUSE & W. R. ANDERSON.
MACHINE FOR CUTTING AND BENDING NUT BLANKS.

No. 477,511. Patented June 21, 1892.

Witnesses
Geo. W. Young,
N. E. Oliphant

Inventors
W. L. Clouse,
W. R. Anderson

By H. G. Underwood
Attorney

United States Patent Office.

WILLIAM L. CLOUSE AND WILLIAM R. ANDERSON, OF TIFFIN, OHIO.

MACHINE FOR CUTTING AND BENDING NUT-BLANKS.

SPECIFICATION forming part of Letters Patent No. 477,511, dated June 21, 1892.

Application filed October 22, 1891. Serial No. 409,502. (No model.)

*To all whom it may concern:*

Be it known that we, WILLIAM L. CLOUSE and WILLIAM R. ANDERSON, citizens of the United States, and residents of Tiffin, in the county of Seneca, and in the State of Ohio, have invented certain new and useful Improvements in Machines for Cutting and Bending Nut-Blanks; and we do hereby declare that the following is a full, clear, and exact description thereof.

Our invention has for its object to provide a machine by which blanks for nuts may be cut from a bar, bent into rings around a mandrel, and stripped from the latter by a succession of operations; and it consists in certain peculiarities of construction and combination of parts, to be hereinafter described with reference to the accompanying drawings and subsequently claimed.

Figure 1:
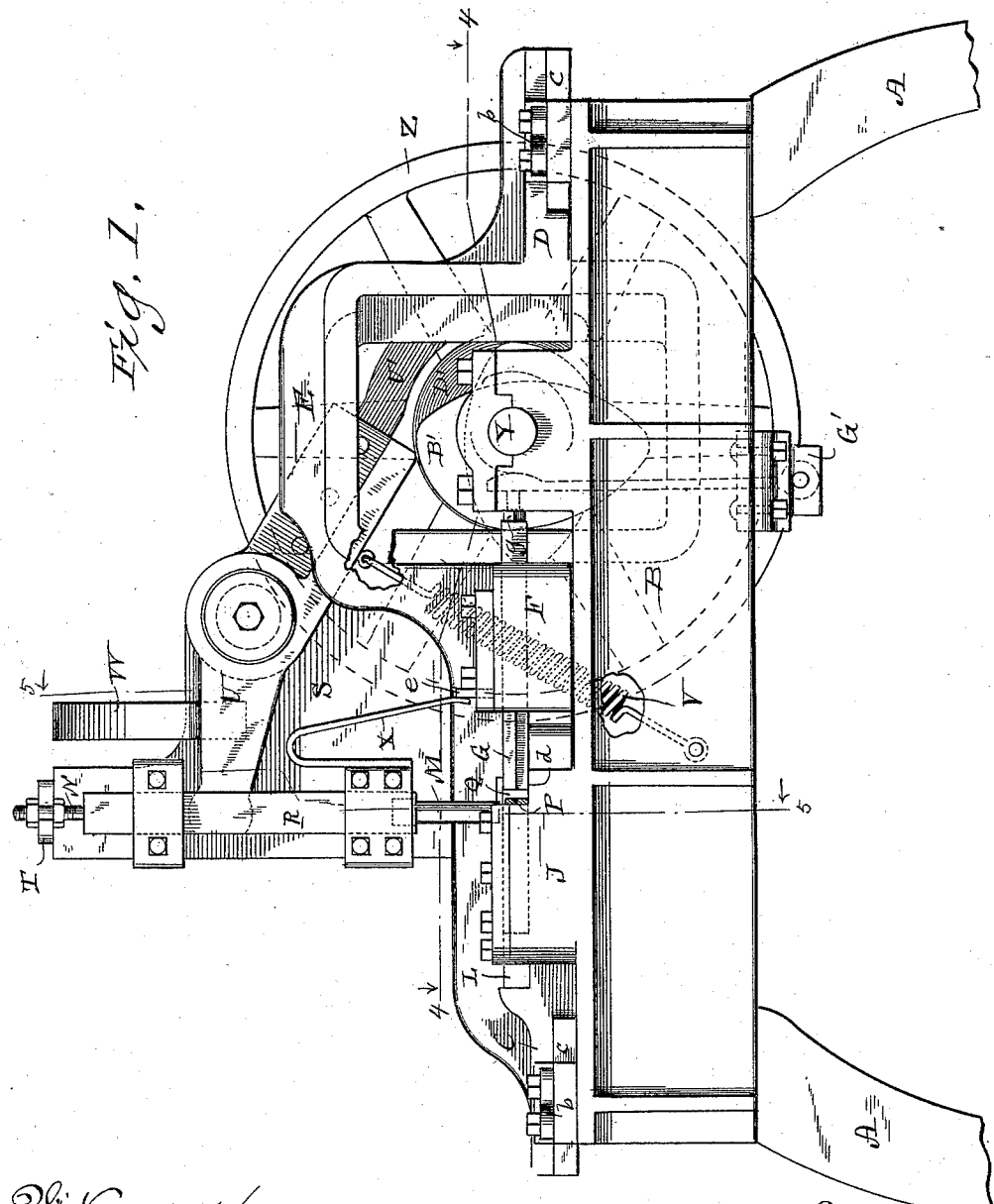
Figure 2:
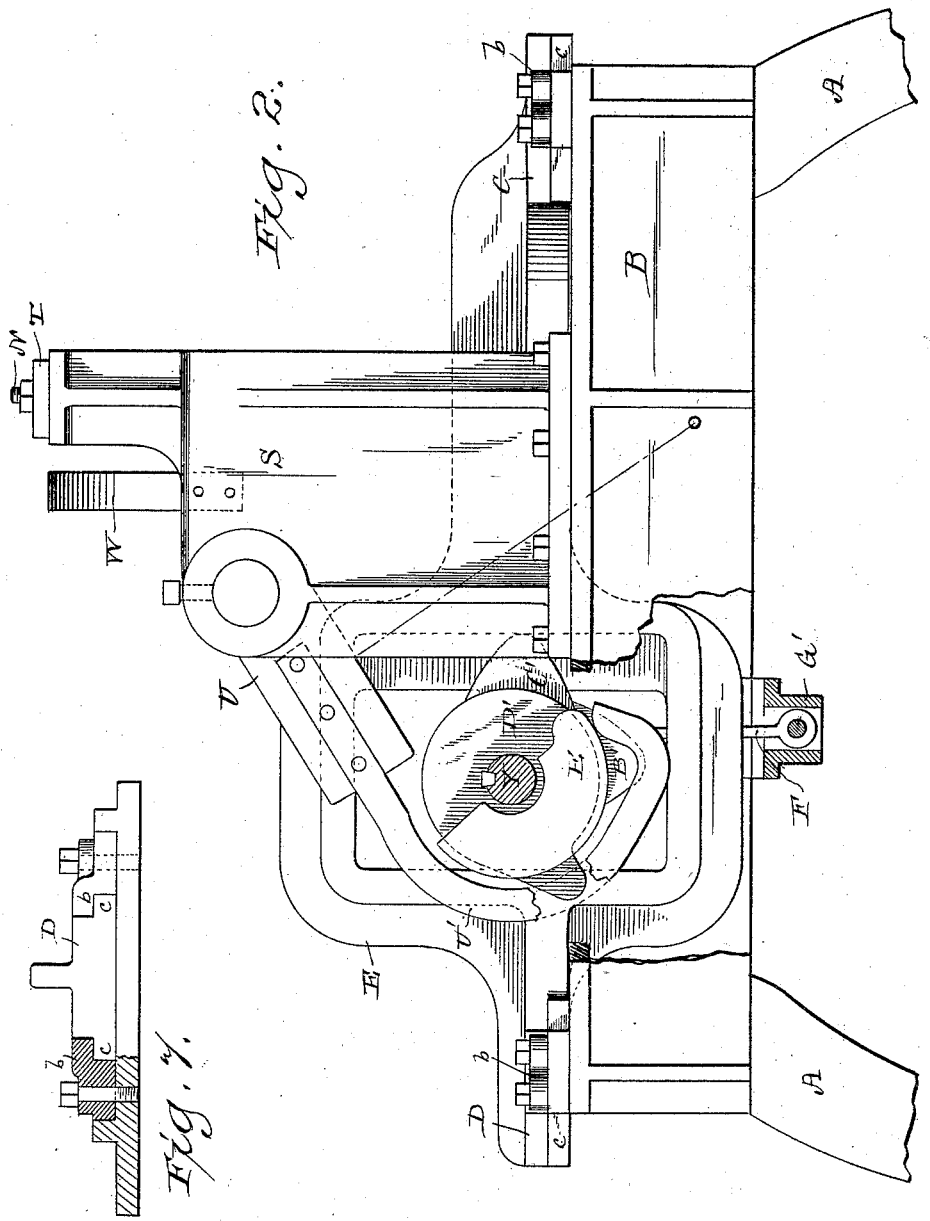
Figure 3:
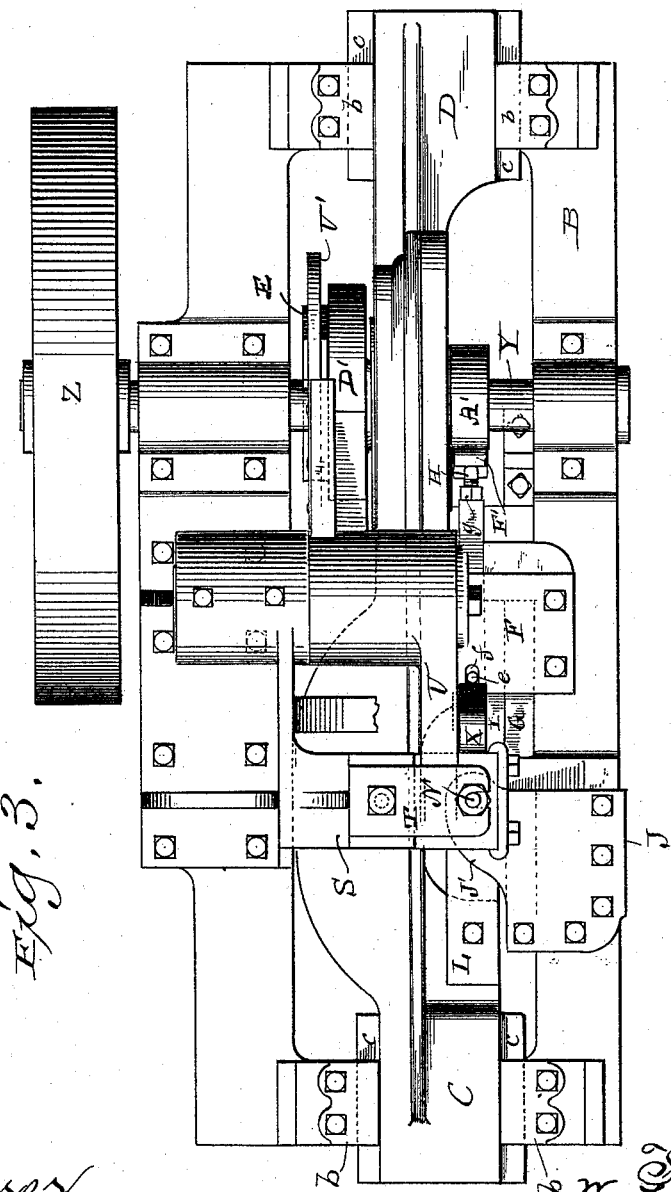
Figure 4:
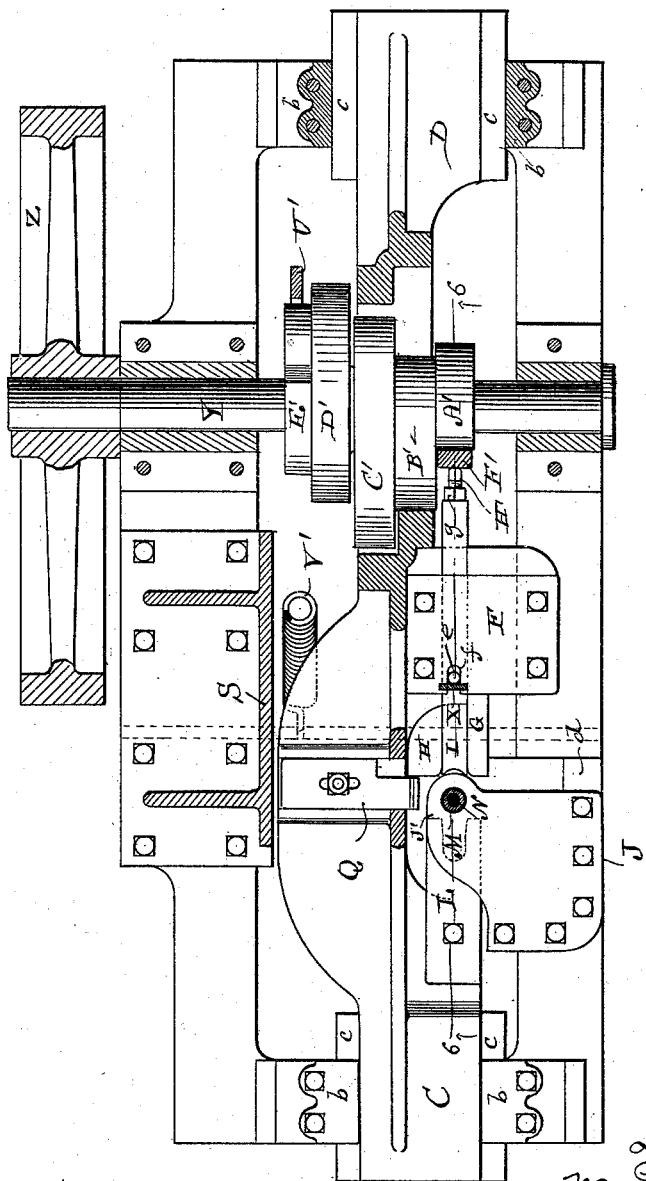
Figure 5:
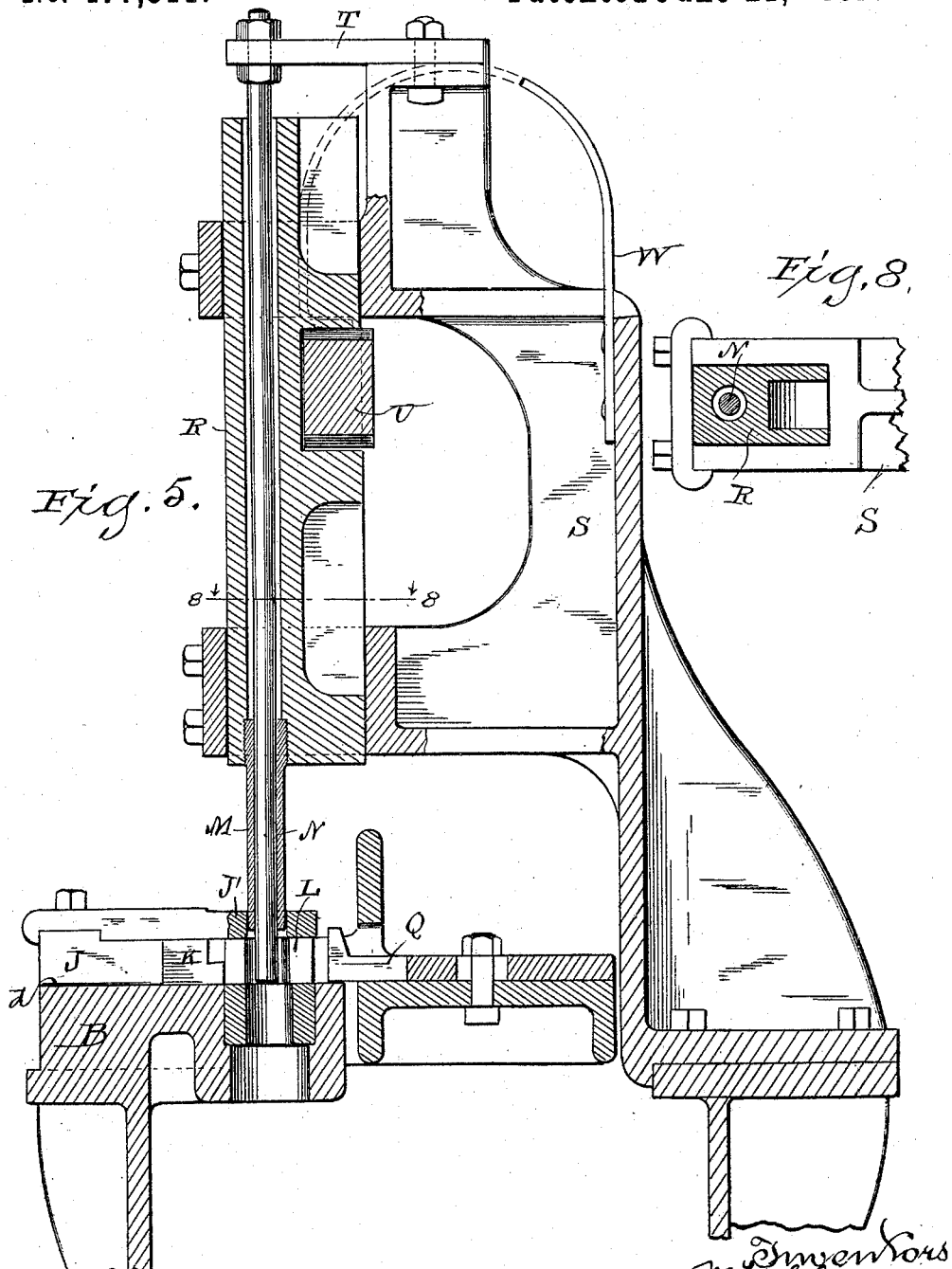
Figure 6:
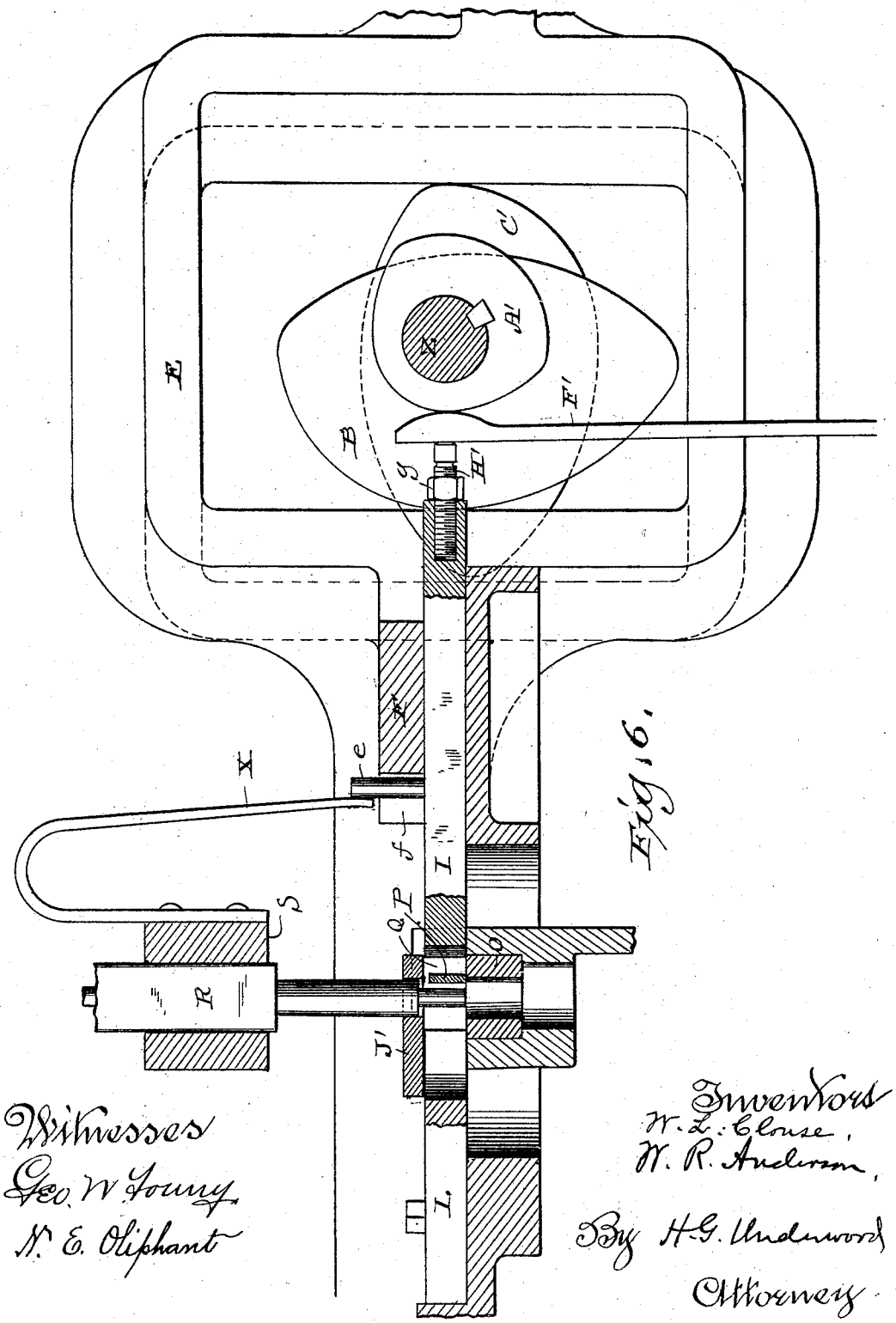

In the drawings, Figure 1 represents an elevation of one side of a machine constructed according to our invention and partly broken away; Fig. 2, a like view of the other side of the machine; Fig. 3, a plan view of the same; Fig. 4, a like view, partly in horizontal section, on line 4 4 of Fig. 1; Fig. 5, a vertical transverse section; Fig. 6, a vertical longitudinal section on line 6 6 of Fig. 4; Fig. 7, a detail front elevation of a portion of said machine, partly in section; Fig. 8, a horizontal section on line 8 8 of Fig. 5; and Figs. 9 to 15, inclusive, are diagram views designed to illustrate the operation of the aforesaid machine.

Referring by letter to the drawings, A represents the legs on which the bed B of our machine is supported, this bed being provided with guides $b$ for lateral flanges $c$ on longitudinal front and rear extensions C D of a yoke E, the latter being reciprocated on said bed by a cam mechanism hereinafter described.

Integral with the front extension C of the yoke, on that side thereof nearest the operator, is a lateral box F, that carries two dies G H, removably secured therein, and is provided with a guideway for an intermediate die I, the latter being independently reciprocated by a cam and spring mechanism hereinafter specified.

Removably secured in a block J, forming part of the machine-bed, on that side nearest the operator, is a die K, opposed to and matching the one G in the yoke-box above described. These latter dies have shear-edges and are preferably of such form that by their engagement a notch of approximate L shape is cut in a nut-blank at the time that the same is sheared from a bar, the horizontal line of the notch being somewhat acute to the vertical line thereof, whereby when said blank is bent into a ring there will be an engagement of its notched ends to form a lock, which prevents undue spreading or opening of the finished nut when the latter is screwed upon a bolt. The nut-blank herein shown is fully set forth and claimed in an application for patent filed May 4, 1891, Serial No. 391,501, and forms no part of the present invention, it being obvious that the shear-dies G K may be of any desirable contour.

The removable top of the stationary block J has an inwardly-extending flange J', that overlaps a bifurcated bending-die L, detachably secured to the front extension C of the yoke E, above described, and a vertical opening in said block extension serves as a guide for a stripper M, arranged to work loosely on a vertical stationary mandrel N, this mandrel being circular in horizontal section and centered above a sleeve O, shown herein as being removably seated in the machine-bed over an opening in the latter. The bore of the sleeve O is of a diameter equal to that of the rings formed by the machine and is made removable, so that in case of wear another may be substituted; but it is possible in practice to do away with said sleeve and have the opening in the machine-bed of a diameter corresponding to the rings.

As best illustrated in Fig. 1, the bar P, from which the blanks are cut, is fed in on a right-angular depression $d$ in the rear upper corner of the bed-block J to oppose the mandrel N, the length of feed being regulated by a gage Q, adjustable on the machine-bed, as best illustrated in Figs. 4 and 5. The stripper M is set in a slide-block R, that works in guides on a vertical standard S, bolted or otherwise rigidly secured to the machine-bed, and the mandrel N extends up through an opening in said slide-block to connect with an arm T, that is fast on the top of the standard S for the purpose of supporting said mandrel. Engaging the slide-block R is a lever U, that is trunnioned to the standard S and provided with a hook-shaped extension U', said lever being also connected to the bed-piece of the machine by means of a spiral spring V and limited as to upward throw by a buffer-spring W on said standard. Fast on the lower one of the guides for the slide-block R is one end of a flat bow-spring X, and the free end of this spring presses against a stud $e$, that extends up from the die I through a recess $f$ in the yoke-box F, above described.

Supported in suitable bearings on the machine-bed is a transverse shaft Y, and fast on this shaft is a drive-wheel Z and a series of cams A' B' C' D' E', as is best illustrated in Fig. 4. The cam A' works in opposition to a vertical arm F', pivotally connected to a hanger G' on the under side of the machine-bed, as best illustrated in Figs. 1 and 2, this bar being in opposition to screw H', that engages the rear end of the die I, and is held in its adjusted position by means of a set-nut $g$, the adjustment of this screw serving to regulate the throw of said die in proportion to the thickness of the bar from which the nut-blanks are cut. The die I is carried forward by the action of the cam A' against the resistance of the spring X, and the expansion of this spring acts to return said die to its normal position after the cam has ceased to exert its power. The cam B' operates to move the yoke E forward, and the cam C' is timed so as to move said yoke to the rear after said cam B' has done its work. The cam D' operates to tilt the trunnioned lever U against the power of the spring V, and the cam E' operates against the hook-shaped extension U' of said lever to insure the return of the latter to its normal position.

Figure 13:
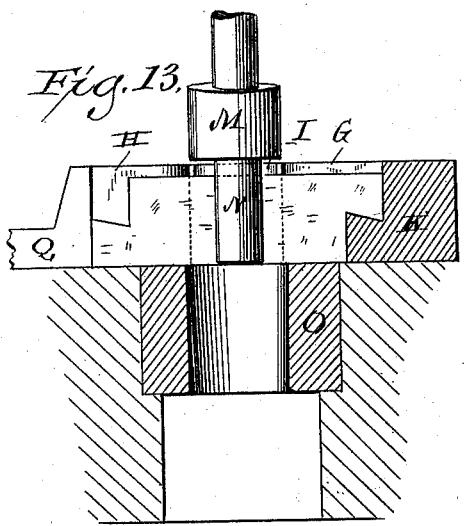
Figure 15:
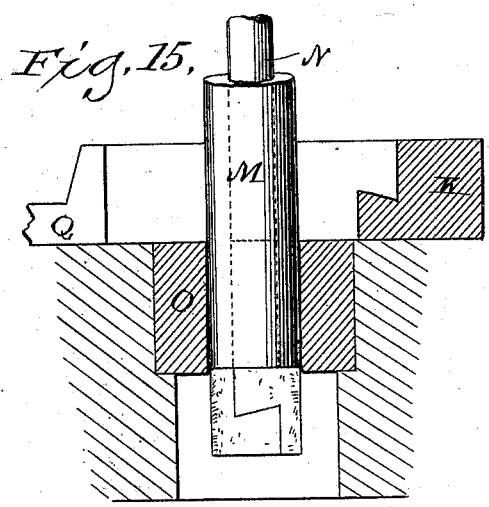
Figure 14:
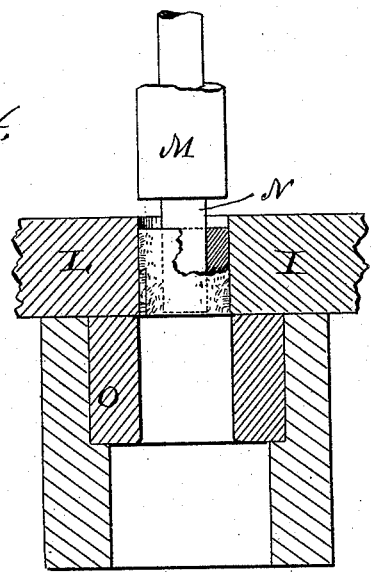

In the operation of the machine above described the bar from which nut-blanks are to be cut is first notched at the feed end and then pushed in against the gage Q to stand in opposition to the mandrel N, as best illustrated in Fig. 9, the dies G, H, I, and L being at this time in about the position shown in the same figure. The shaft Y being in rotation, the cam B' acts to move the yoke E forward, and thus the dies G H I are carried in the same direction, the die I being followed by the pivotal arm F', that is actuated by the cam A' against the resistance of the spring X, above specified. The forward movement of the die G in opposition to the stationary die K cuts off a nut-blank from the bar and notches the cut ends of said blank-bar, and at this time the die I has a movement of its own through the cam A' and pivotal arm F' sufficient to force the cut blank tight against the mandrel N, as shown in Fig. 13, the working face of the latter die being concave concentric with said mandrel. By the continued forward movement of the yoke E the dies G H are caused to bend the blank around the mandrel in the form of a ⊃, as shown by Fig. 10, this operation being completed about the time the cam B' ceases to operate against said yoke. The cam C' now comes into play, and thus the yoke E is moved toward the rear to carry back the dies G H independent of the die I, the cam A' being so timed that this latter die is still acting as a clamp to hold the bent blank to the mandrel. At a certain time during the rearward movement of the yoke E the bifurcated die L on the yoke extension C engages the bent blank, as shown by Fig. 11, and as the rearward movement of said yoke is continued this latter die (having a portion thereof concentric to the mandrel N) will cause a further bending of the blank into a ring, as shown in Figs. 12 and 14. At this time the cam A' passes away from the pivoted arm F' and the spring X expands to return the die I to its normal position, while at the same time the cam D' lifts upon the lever U to depress the slide-block R, and thereby cause the stripper M to force the ring off the mandrel N and through the sleeve O, as shown in Fig. 15. The cam D' having done its work and passed out of contact with the lever U, the contraction of the now-expanded spring V will tend to cause an automatic return of said lever to its normal position and a consequent lift of the slide-block R, that carries the stripper M; but to insure the latter operation the cam E' is timed to come into play against the hook-shaped extension of said lever and tilt the latter on its trunnions, the quick return of the aforesaid lever being cushioned by the buffer-spring W, above described.

Having thus described our invention, what we claim as new, and desire to secure by Letters Patent, is—

1. The combination of a circular mandrel, a stationary shear-die, a pair of reciprocative bending-dies, one of which is also a shear-die, in opposition to said stationary die, an independently-reciprocated clamping-die arranged intermediate of said bending-dies, in opposition to the mandrel, another reciprocative bending-die opposed to that side of the mandrel farthest from the aforesaid bending and clamping dies, and a stripper reciprocative on said mandrel, substantially as set forth.

2. The combination of a circular mandrel, a stationary shear-die having a notched portion that presents a horizontal edge acute to a vertical edge, a pair of reciprocative bending-dies, one of which is also a shear-die in opposition to said stationary die, an independently-reciprocative clamping-die arranged intermediate of said bending-dies, in oppostion to the mandrel, another reciprocative bending-die opposed to that side of the mandrel farthest from the aforesaid bending and clamping dies, and a stripper reciprocative on said mandrel, substantially as set forth.

3. The combination of a circular mandrel, a stationary shear-die, a pair of reciprocative bending-dies, one of which is also a shear-die, in opposition to said stationary die, an independently-reciprocated clamping-die adjustable as to throw and arranged intermediate of said bending-dies in opposition to the mandrel, another reciprocative bending-die opposed to that side of the mandrel farthest from the aforesaid bending and clamping dies, and a stripper reciprocative on said mandrel, substantially as set forth.

4. The combination of a circular mandrel, a stationary shear-die, an adjustable gage at right angles to the mandrel, a pair of reciprocative bending-dies, one of which is also a shear-die, in opposition to said stationary die, an independently-reciprocated clamping-die arranged intermediate of said bending-dies in opposition to the mandrel, another reciprocative bending-die opposed to that side of the mandrel farthest from the aforesaid bending and clamping dies, and a stripper reciprocative on said mandrel, substantially as set forth.

5. The combination of a circular mandrel, a stationary shear-die, a pair of reciprocative bending-dies, one of which is also a shear-die, in opposition to said stationary die, a spring-controlled cam-actuated clamping-die having an independent reciprocation intermediate of said bending-dies in opposition to the mandrel, another reciprocative bending-die opposed to that side of the mandrel farthest from the aforesaid bending and clamping dies, and a stripper reciprocative on said mandrel, substantially as set forth.

6. The combination of a circular mandrel, a stationary shear-die, a pair of reciprocative bending-dies, one of which is also a shear-die, in opposition to said stationary die, an independently-reciprocative clamping-die arranged intermediate of said bending-dies in opposition to the mandrel, another reciprocative bending-die opposed to that side of the mandrel farthest from the aforesaid bending and clamping dies, a sliding block carrying a stripper in loose engagement with said mandrel, and a spring-controlled cam-actuated lever engaging the slide-block, substantially as set forth.

7. The combination of a stationary horizontal bed provided with a standard, a circular mandrel hung from the standard, a block loose in guides on said standard, a stripper carried by the block in loose engagement with the mandrel, a tilting lever connected to said block, a buffer-spring arranged on the aforesaid standard in opposition to the lever, a shear-die fast on said bed, a pair of reciprocative bending-dies, one of which is also a shear-die, in opposition to the aforesaid shear-die, an independently-reciprocative clamping-die arranged intermediate of said bending-dies in opposition to said mandrel, and another reciprocative die opposed to that side of the mandrel farthest from the aforesaid bending and clamping dies, substantially as set forth.

8. The combination of a stationary horizontal bed provided with a standard, a circular mandrel hung from the standard, a block loose in guides on the standard, a stripper carried by the block in loose engagement with the mandrel, a cam-actuated lever trunnioned on said standard and connected to said block, a shear-die fast on said bed, a pair of reciprocative bending-dies, one of which is also a shear-die, in opposition to the aforesaid shear-die, an independently-reciprocative clamping-die arranged intermediate of said bending-dies in opposition to said mandrel, and another reciprocative die opposed to that side of the mandrel farthest from the aforesaid bending and clamping dies, substantially as set forth.

9. The combination of a stationary horizontal bed provided with a standard, a circular mandrel hung from the standard, a block loose in guides on the standard, a stripper carried by the block in loose engagement with the mandrel, a cam-actuated spring-controlled lever trunnioned on said standard and connected to said block, a shear-die fast on said bed, a pair of reciprocative bending-dies, one of which is also a shear-die, in opposition to the aforesaid shear-die, an independently-reciprocative clamping-die arranged intermediate of said bending-dies in opposition to said mandrel, and another reciprocative die opposed to that side of the mandrel farthest from the aforesaid bending and clamping dies, substantially as set forth.

10. The combination of a stationary horizontal bed, a block integral with the bed and provided with a removable top having a perforated flange, a stationary shear-die arranged in the block, a circular mandrel having the same center as the perforation in the box-top flange, a yoke reciprocative on the bed and having a rear extension provided with an integral box, a pair of bending-dies arranged in the yoke-box, one of these dies being also a shear-die, in opposition to the one in the bed-block, an independently-reciprocative clamping-die also arranged in said yoke-box intermediate of the bending-dies in opposition to the mandrel, another bending-die on a front extension of said yoke, a standard on said bed, provided with a support for said mandrel, a slide-block reciprocative on the standard, and a stripper carried by the slide-block in loose engagement with the aforesaid mandrel, and the perforation in said box-top flange, substantially as set forth.

In testimony that we claim the foregoing we have hereunto set our hands, at Tiffin, in the county of Seneca and State of Ohio, in the presence of two witnesses.

WILLIAM L. CLOUSE.
WILLIAM R. ANDERSON.

Witnesses:
HARRY W. MACAVOY,
COOPER K. W. GILBERT.